(12) United States Patent
Sakuma et al.

(10) Patent No.: US 10,900,403 B2
(45) Date of Patent: Jan. 26, 2021

(54) ABNORMALITY DIAGNOSIS APPARATUS

(71) Applicant: TOYOTA JIDOSHA KABUSHIKI KAISHA, Aichi-ken (JP)

(72) Inventors: Tetsuya Sakuma, Gotemba (JP); Keishi Takada, Kanagawa-ken (JP); Hiromasa Nishioka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 42 days.

(21) Appl. No.: 16/355,632

(22) Filed: Mar. 15, 2019

(65) Prior Publication Data

US 2019/0284980 A1   Sep. 19, 2019

(30) Foreign Application Priority Data

Mar. 16, 2018 (JP) .................. 2018-048941

(51) Int. Cl.
*F01N 3/20* (2006.01)
*F01N 11/00* (2006.01)
(Continued)

(52) U.S. Cl.
CPC .......... *F01N 11/00* (2013.01); *B01D 53/9436* (2013.01); *B01D 53/9495* (2013.01);
(Continued)

(58) Field of Classification Search
CPC . F01N 11/00; F01N 9/00; F01N 3/208; F01N 2610/146; F01N 2550/02; F01N 2560/12; F01N 2560/14; F01N 2560/028; F01N 2900/1602; F01N 2900/1628; F01N 2560/021; F01N 2900/1622; F01N 2550/05; F01N 2610/02; F01N 3/2066; F01N 2570/14; B01D 53/9436; B01D 53/9495; B01D 2251/2062
See application file for complete search history.

(56) References Cited

U.S. PATENT DOCUMENTS

| | | | |
|---|---|---|---|
| 2007/0101705 A1* | 5/2007 | Knitt | F01N 11/00 60/295 |
| 2009/0217818 A1* | 9/2009 | Gonze | F01N 3/028 95/278 |

(Continued)

FOREIGN PATENT DOCUMENTS

| | | |
|---|---|---|
| DE | 102014209305 A1 | 11/2015 |
| JP | 2009-127496 A | 6/2009 |

*Primary Examiner* — Matthew T Largi
(74) *Attorney, Agent, or Firm* — Hauptman Ham, LLP

(57) ABSTRACT

The NOx catalyst is irradiated with an electromagnetic wave, a resonance frequency and a ratio of a reception power to an oscillation power at the time of the irradiation are detected, and an upper limit value of a change amount of the resonance frequency or an upper limit value of a change amount of the ratio at which the NOx catalyst is diagnosed to be abnormal is determined from a change amount of the resonance frequency and a change amount of the ratio until water is adsorbed on all acid sites included in the NOx catalyst, and a change amount of the resonance frequency and a change amount of the ratio until ammonia is adsorbed on all acid sites included in the NOx catalyst, when it is supposed that the NOx catalyst is in a state of being on the borderline between normal and abnormal.

4 Claims, 12 Drawing Sheets

(51) Int. Cl.
*B01D 53/94* (2006.01)
*F01N 9/00* (2006.01)

(52) U.S. Cl.
CPC ............... *F01N 3/208* (2013.01); *F01N 9/00* (2013.01); *B01D 2251/2062* (2013.01); *F01N 2550/02* (2013.01); *F01N 2550/05* (2013.01); *F01N 2560/021* (2013.01); *F01N 2560/028* (2013.01); *F01N 2560/12* (2013.01); *F01N 2560/14* (2013.01); *F01N 2610/02* (2013.01); *F01N 2610/146* (2013.01); *F01N 2900/1602* (2013.01); *F01N 2900/1622* (2013.01); *F01N 2900/1628* (2013.01)

(56) References Cited

U.S. PATENT DOCUMENTS

| | | | |
|---|---|---|---|
| 2010/0212299 A1* | 8/2010 | George | F01N 9/002 60/287 |
| 2010/0242441 A1* | 9/2010 | Kondo | F01N 9/002 60/277 |
| 2012/0159929 A1* | 6/2012 | Snopko | F01N 9/002 60/274 |
| 2017/0107887 A1 | 4/2017 | Beulertz et al. | |
| 2017/0182447 A1* | 6/2017 | Sappok | F01N 11/00 |
| 2017/0211453 A1* | 7/2017 | Sappok | B01D 53/9422 |
| 2017/0292420 A1* | 10/2017 | Imada | F01N 3/028 |
| 2018/0087421 A1* | 3/2018 | Imada | F01N 3/028 |
| 2019/0381455 A1* | 12/2019 | Ikeda | F01N 3/24 |

\* cited by examiner

ABNORMALITY DIAGNOSIS APPARATUS

CROSS REFERENCE TO RELATED APPLICATION

This application claims the benefit of Japanese Patent Application No. 2018-048941, filed on Mar. 16, 2018, which is hereby incorporated by reference herein in its entirety.

BACKGROUND

Technical Field

The present disclosure relates to an abnormality diagnosis apparatus.

A selective reduction NOx catalyst (hereinafter simply referred to as "NOx catalyst") that purifies NOx included in exhaust gas from an internal-combustion engine by using ammonia as a reducing agent is known. The NOx purification rate decreases as the NOx catalyst deteriorates, and hence it is diagnosed whether the degree of the deterioration of the NOx catalyst has exceeded an acceptable range in an in-vehicle state (on-board). The diagnosis of whether the degree of the deterioration of the NOx catalyst has exceeded the acceptable range is hereinafter referred to as abnormality diagnosis. For example, the abnormality diagnosis of the NOx catalyst can be performed by focusing on the fact that the adsorption performance of the ammonia in the NOx catalyst decreases as the NOx catalyst deteriorates. Japanese Patent Application Publication No. 2009-127496 indicates that ammonia is supplied by an amount that causes the ammonia to slip out from a NOx catalyst, and when the ammonia has slipped out from the NOx catalyst, it is determined that the ammonia adsorption amount in the NOx catalyst has reached an upper limit, and the abnormality diagnosis of the NOx catalyst is performed on the basis of the ammonia adsorption amount at that time. In the technique, the ammonia adsorption amount is calculated from the amount of the supplied ammonia, and it is diagnosed that the NOx catalyst is deteriorating when the ammonia adsorption amount is equal to or less than a threshold value.

CITATION LIST

Patent Literature

Patent Literature 1: Japanese Patent Application Publication No. 2009-127496

SUMMARY

Technical Problem

In the technique according to Japanese Patent Application Publication No. 2009-127496, the ammonia needs to be supplied until the ammonia slips out from the NOx catalyst, and hence there is a fear that the ammonia that has slipped out from the NOx catalyst is released into the atmosphere.

Solution to Problem

The present disclosure has been made in view of the abovementioned problem, and an object thereof is to suppress the flowing out of ammonia from a NOx catalyst while abnormality diagnosis of the NOx catalyst is performed.

According to one mode of the present disclosure for solving the abovementioned problem, there is provided an abnormality diagnosis apparatus that diagnoses an abnormality in an exhaust gas purification device of an internal-combustion engine, the exhaust gas purification device comprising: a selective reduction NOx catalyst that is provided in an exhaust passage of the internal-combustion engine, and selectively reduces NOx by ammonia; and an addition valve configured to supply ammonia to the selective reduction NOx catalyst, the abnormality diagnosis apparatus comprising: an irradiation device configured to irradiate the selective reduction NOx catalyst with an electromagnetic wave, and detects a resonance frequency and a ratio of a reception power to an oscillation power at the time of the irradiation; and a controller configured to diagnose whether the selective reduction NOx catalyst is abnormal by comparing the resonance frequency or the ratio detected by the irradiation device with an upper limit value of a change amount of the resonance frequency at which the selective reduction NOx catalyst is diagnosed to be abnormal or an upper limit value of a change amount of the ratio at which the selective reduction NOx catalyst is diagnosed to be abnormal, the upper limit values being determined from a change amount of the resonance frequency and a change amount of the ratio until water is adsorbed on all acid sites included in the selective reduction NOx catalyst when it is supposed that the selective reduction NOx catalyst is in a state of being on a borderline between normal and abnormal, and a change amount of the resonance frequency and a change amount of the ratio until ammonia is adsorbed on all acid sites included in the selective reduction NOx catalyst when it is supposed that the selective reduction NOx catalyst is in a state of being on a borderline between normal and abnormal.

In the NOx catalyst, the ammonia is adsorbed on the acid sites, but the number of the acid sites decreases as the NOx catalyst deteriorates, and hence the amount of the ammonia that can be adsorbed on the NOx catalyst decreases. The change amount of the resonance frequency and the change amount of the ratio of the reception power to the oscillation power (hereinafter also simply referred to as "power ratio") when the irradiation device applies the electromagnetic wave are in a correlation relationship with the amount of the ammonia or the water adsorbed on the NOx catalyst. The "change amount" in the change amount of the resonance frequency and the change amount of the power ratio is the change amount from the state in which the ammonia and the water are not adsorbed on the NOx catalyst. When the adsorption amount of the ammonia decreases when the number of the acid sites decreases as the NOx catalyst deteriorates, the change amount of the resonance frequency and the change amount of the power ratio also decrease, and hence it can be conceived to perform the abnormality diagnosis of the NOx catalyst on the basis of the change amount of the resonance frequency and the change amount of the power ratio. However, the absorption property of the energy and the property of changing the resonance frequency when the electromagnetic wave is applied differs between the ammonia and the water. Thus, even when the degree of the deterioration of the NOx catalyst is the same, the change amount of the resonance frequency and the change amount of the power ratio may be different depending on the ratio between the ammonia and the water adsorbed on the NOx catalyst.

Therefore, the upper limit value of the change amount of the resonance frequency or the upper limit value of the change amount of the power ratio at which the NOx catalyst can be said to be abnormal is specified on the basis of the change amount of the resonance frequency and the change amount of the power ratio until the water is adsorbed on all of the acid sites included in the NOx catalyst when it is supposed that the NOx catalyst is in a state of being on the borderline between normal and abnormal, and the change amount of the resonance frequency and the change amount of the power ratio until the ammonia is adsorbed on all of the acid sites included in the NOx catalyst when it is supposed that the NOx catalyst is in a state of being on the borderline between normal and abnormal. The state in which the NOx catalyst is on the borderline between normal and abnormal is a state in which the degree of the deterioration of the NOx catalyst exceeds the acceptable range when the degree of the deterioration of the NOx catalyst progresses any further. The change amount of the resonance frequency and the change amount of the power ratio when the ammonia is adsorbed on all of the acid sites, and the change amount of the resonance frequency and the change amount of the power ratio when the water is adsorbed on all of the acid sites are in a predetermined relationship, and it has been found that the upper limit values of the change amount of the resonance frequency and the change amount of the power ratio at which the NOx catalyst can be said to be abnormal are determined on the basis of the predetermined relationship. By performing the deterioration determination of the NOx catalyst on the basis of the upper limit values determined as described above, the abnormality diagnosis that takes the influence of the adsorbed ammonia and water into consideration can be performed even when the ratio between the ammonia and the water adsorbed on the NOx catalyst is unknown. Therefore, the accuracy of the abnormality diagnosis can be enhanced. In particular, the water is adsorbed on the NOx catalyst when the temperature of the NOx catalyst is low, and hence there is no need to adsorb the ammonia on all of the acid sites. That is, even when the controller performs the abnormality diagnosis in a state in which the ammonia or the water is adsorbed on all of the acid sites, there is no need to adsorb the ammonia on all of the acid sites, and hence there is no need to supply the ammonia to the point where the NOx catalyst is saturated with the ammonia. Therefore, the flowing out of the ammonia from the NOx catalyst can be suppressed.

The controller can: obtain a linear function expressing a relationship between the change amount of the resonance frequency and the change amount of the ratio from the change amount of the resonance frequency and the change amount of the ratio until the water is adsorbed on all of the acid sites included in the selective reduction NOx catalyst when it is supposed that the selective reduction NOx catalyst is in a state of being on a borderline between normal and abnormal, and the change amount of the resonance frequency and the change amount of the ratio until the ammonia is adsorbed on all of the acid sites included in the selective reduction NOx catalyst when it is supposed that the selective reduction NOx catalyst is in a state of being on a borderline between normal and abnormal; set a value calculated by substituting the change amount of the resonance frequency for a variable of the linear function as the upper limit value of the change amount of the ratio at which the selective reduction NOx catalyst is diagnosed to be abnormal, or set a value calculated by substituting the change amount of the ratio for a variable of the linear function as the upper limit value of the change amount of the resonance frequency at which the selective reduction NOx catalyst is diagnosed to be abnormal; and diagnose that the selective reduction NOx catalyst is abnormal when the change amount of the resonance frequency detected by the irradiation device is equal to or lower than the upper limit value of the change amount of the resonance frequency or when the change amount of the ratio detected by the irradiation device is equal to or lower than the upper limit value of the change amount of the ratio.

The linear function expresses the relationship between the change amount of the resonance frequency and the change amount of the power ratio that transition when the ratio between the ammonia and the water changes when the ammonia or the water is adsorbed on all of the acid sites included in the NOx catalyst when it is supposed that the NOx catalyst is in a state of being on the borderline between normal and abnormal. When it is supposed that the NOx catalyst is in a state of being on the borderline between normal and abnormal, although the change amount of the resonance frequency and the change amount of the power ratio differ depending on the ratio between the adsorbed ammonia and water when the ammonia or the water is adsorbed on all of the acid sites of the NOx catalyst, every change amount satisfies the relationship of the abovementioned linear function. The change amount of the power ratio calculated by substituting the change amount of the resonance frequency for the linear function corresponds to the change amount of the power ratio when it is supposed that the NOx catalyst is in a state of being on the borderline between normal and abnormal. That is, the change amount of the power ratio corresponds to the upper limit value of the change amount of the power ratio at which the NOx catalyst is diagnosed to be abnormal. When the detected change amount of the power ratio is smaller than the upper limit value of the change amount of the power ratio calculated as described above, the degree of the deterioration of the NOx catalyst has progressed from when the NOx catalyst is in a state of being on the borderline between normal and abnormal, and hence the NOx catalyst can be diagnosed to be abnormal. The change amount of the resonance frequency calculated by substituting the change amount of the power ratio for the linear function corresponds to the change amount of the resonance frequency when it is supposed that the NOx catalyst is in a state of being on the borderline between normal and abnormal. That is, the change amount of the resonance frequency corresponds to the upper limit value of the change amount of the resonance frequency when the NOx catalyst is diagnosed to be abnormal. When the detected change amount of the resonance frequency is smaller than the upper limit value of the change amount of the resonance frequency calculated as described above, the degree of the deterioration of the NOx catalyst has proceeded from when the NOx catalyst is in a state of being on the borderline between normal and abnormal, and hence the NOx catalyst can be diagnosed to be abnormal.

The controller can: set the change amount of the resonance frequency until the ammonia is adsorbed on all of the acid sites included in the selective reduction NOx catalyst when it is supposed that the selective reduction NOx catalyst is in a state of being on a borderline between normal and abnormal, as the upper limit value of the change amount of the resonance frequency at which the selective reduction NOx catalyst is diagnosed to be abnormal, and set the change amount of the ratio until the water is adsorbed on all of the acid sites included in the selective reduction NOx catalyst when it is supposed that the selective reduction NOx catalyst is in a state of being on a borderline between normal and abnormal, as the upper limit value of the change amount of the ratio at which the selective reduction NOx catalyst is diagnosed to be abnormal; and diagnose that the selective reduction NOx catalyst is abnormal when at least one of a case where the change amount of the resonance frequency detected by the irradiation device is equal to or lower than the upper limit value of the change amount of the resonance frequency and a case where the change amount of the ratio detected by the irradiation device is equal to or lower than the upper limit value of the change amount of the ratio, holds true.

The ratio of the change amount of the power ratio to the change amount of the resonance frequency increases when the water is adsorbed on all of the acid sites of the NOx catalyst as compared to when the ammonia is adsorbed on all of the acid sites of the NOx catalyst. Therefore, when it is supposed that the degree of the deterioration of the NOx catalyst is the same, the change amount of the power transmittance becomes the largest in a state in which the water is adsorbed on all of the acid sites of the NOx catalyst. When it is supposed that the degree of the deterioration of the NOx catalyst is the same, the change amount of the resonance frequency becomes the largest when the ammonia is adsorbed on all of the acid sites of the NOx catalyst. When the detected change amount of the resonance frequency is larger than the change amount of the resonance frequency until the ammonia is adsorbed on all of the acid sites included in the NOx catalyst when it is supposed that the NOx catalyst is in a state of being on the borderline between normal and abnormal, and the detected change amount of the power ratio is larger than the change amount of the power ratio until the water is adsorbed on all of the acid sites included in the NOx catalyst when it is supposed that the NOx catalyst is in a state of being on the borderline between normal and abnormal, the change amount of the resonance frequency and the change amount of the power ratio both indicate normality, and hence the NOx catalyst can be diagnosed to be normal. Meanwhile, in case of at least one of a case where the detected change amount of the resonance frequency is smaller than the change amount of the resonance frequency until the ammonia is adsorbed on all of the acid sites included in the NOx catalyst when it is supposed that the NOx catalyst is in a state of being on the borderline between normal and abnormal, and a case where the detected change amount of the power ratio is smaller than the change amount of the power ratio until the water is adsorbed on all of the acid sites included in the NOx catalyst when it is supposed that the NOx catalyst is in a state of being on the borderline between normal and abnormal, the NOx catalyst may be normal or abnormal. In that case, by always diagnosing that the NOx catalyst is abnormal, a case where the NOx catalyst is misdiagnosed to be normal even though the NOx catalyst is abnormal can be suppressed. In that case, the change amount of the resonance frequency until the ammonia is adsorbed on all of the acid sites included in the NOx catalyst when it is supposed that the NOx catalyst is in a state of being on the borderline between normal and abnormal becomes the upper limit value of the change amount of the resonance frequency at which the NOx catalyst is diagnosed to be abnormal, and the change amount of the power ratio until the water is adsorbed on all of the acid sites included in the NOx catalyst when it is supposed that the NOx catalyst is in a state of being on the borderline between normal and abnormal becomes the upper limit value of the change amount of the power ratio at which the NOx catalyst is diagnosed to be abnormal.

The controller can change the upper limit value of the change amount of the resonance frequency and the upper limit value of the change amount of the ratio, in accordance with a temperature of the selective reduction NOx catalyst.

The absorption property of the energy and the property of changing the resonance frequency when the ammonia and the water adsorbed on the NOx catalyst is irradiated with the electromagnetic wave may be changed in accordance with the temperature of the NOx catalyst. Therefore, the upper limit value of the change amount of the resonance frequency at which the NOx catalyst is diagnosed to be abnormal and the upper limit value of the change amount of the power ratio at which the NOx catalyst is diagnosed to be abnormal may also change in accordance with the temperature of the NOx catalyst, and hence the accuracy of the abnormality diagnosis of the NOx catalyst can be enhanced by changing those upper limit values in accordance with the temperature of the NOx catalyst.

According to the present disclosure, the flowing out of the ammonia from the NOx catalyst can be suppressed while the abnormality diagnosis of the NOx catalyst can be performed.

DESCRIPTION OF THE EMBODIMENTS

With reference to the drawings, modes for carrying out the present disclosure are illustratively described below in detail on the basis of embodiments. Note that the dimensions, materials, shapes, relative positional relationship, and the like of structural elements described in the embodiments should not be interpreted to limit the scope of the present disclosure unless otherwise noted.

Embodiment 1

Figure 1:
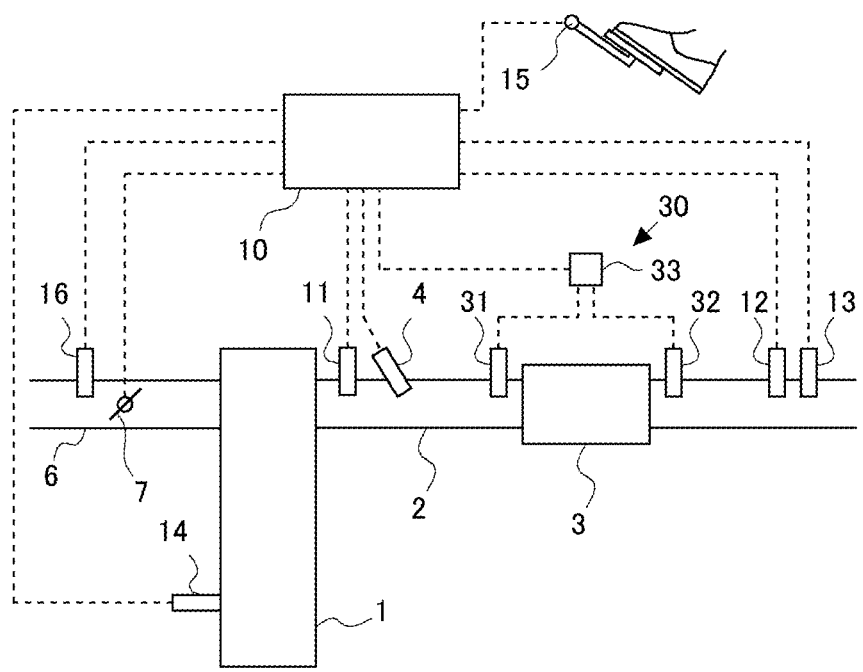
FIG. 1 is a view illustrating a schematic configuration of an internal-combustion engine, and an intake system and an exhaust system thereof according to Embodiment 1 and Embodiment 2.

FIG. 1 is a view illustrating a schematic configuration of an internal-combustion engine 1 and an intake system and an exhaust system thereof according to Embodiment 1. The internal-combustion engine 1 is a diesel engine for driving a vehicle. However, the internal-combustion engine 1 may be a gasoline engine. An exhaust passage 2 is connected to the internal-combustion engine 1. A selective reduction NOx catalyst 3 (hereinafter referred to as "NOx catalyst 3") that selectively reduces NOx in the exhaust gas by using ammonia as a reducing agent is provided in the exhaust passage 2. The NOx catalyst 3 is accommodated in a metallic case.

In the exhaust passage 2 upstream of the NOx catalyst 3, an addition valve 4 that shoots out aqueous urea into the exhaust gas is provided. The aqueous urea is a precursor of ammonia ($NH_3$). The aqueous urea that is shot out from the addition valve 4 becomes ammonia by being hydrolyzed by the heat of the exhaust gas or the heat from the NOx catalyst 3 and is adsorbed on the NOx catalyst 3. The ammonia is used as a reducing agent in the NOx catalyst 3. The addition valve 4 may be an addition valve that shoots out ammonia instead of aqueous urea. In this embodiment, the addition valve 4 corresponds to the addition valve in the present disclosure.

In the exhaust passage 2 upstream of the addition valve 4, an upstream-side NOx sensor 11 that detects the NOx in the exhaust gas flowing into the NOx catalyst 3 is provided. In the exhaust passage 2 downstream of the NOx catalyst 3, a downstream-side NOx sensor 12 that detects the NOx in the exhaust gas flowing out from the NOx catalyst 3, and a temperature sensor 13 that detects the exhaust gas temperature are provided. The temperature sensor 13 may be attached to the NOx catalyst 3 so as to detect the temperature of the NOx catalyst 3. In this embodiment, the temperature sensor 13 corresponds to a temperature acquisition unit in the present disclosure.

An irradiation device 30 that irradiates the NOx catalyst 3 with an electromagnetic wave (microwave) is provided in the exhaust passage 2. The irradiation device 30 includes a first probe 31 provided in the exhaust passage 2 upstream of the NOx catalyst 3, a second probe 32 provided in the exhaust passage 2 downstream of the NOx catalyst 3, and a frequency control device 33. The first probe 31 and the second probe 32 are rod antennas, and are connected to the frequency control device 33. The frequency control device 33 has a function of oscillator and a receiver that generate an electromagnetic wave (microwave) between the first probe 31 and the second probe 32, and further has a function of changing the frequency of the microwave and acquiring the resonance frequency, the oscillation power, and the reception power. In this embodiment, the NOx catalyst 3 is irradiated with the microwave with use of rod antennas, but the NOx catalyst 3 may be irradiated with the microwave with use of a waveguide instead. In this embodiment, the irradiation device 30 corresponds to an irradiation device in the present disclosure.

An intake passage 6 is connected to the internal-combustion engine 1. A throttle 7 that adjusts the intake air amount of the internal-combustion engine 1 is provided in the middle of the intake passage 6. In the intake passage 6 upstream of the throttle 7, an air flow meter 16 that detects the intake air amount of the internal-combustion engine 1 is mounted.

An ECU 10 that is an electronic control unit is provided together with the internal-combustion engine 1. The ECU 10 is formed as a digital computer having a well-known configuration including a read-only memory (ROM), a random access memory (RAM), a microprocessor (CPU), an input/output port, and the like. In the ROM of the ECU 10, a plurality of programs are stored, and the operation state, an exhaust gas purification device, and the like of the internal-combustion engine 1 are controlled by executing a predetermined program by the ECU 10. Other than the temperature sensor 13 and the air flow meter 16 described above, a crank position sensor 14 and an accelerator opening degree sensor 15 are electrically connected to the ECU 10, and output values of the sensors are passed to the ECU 10.

The ECU 10 can grasp the operation state of the internal-combustion engine 1 such as the engine rotational speed based on the detection of the crank position sensor 14 and the engine load based on the detection of the accelerator opening degree sensor 15. The ECU 10 can estimate the temperature of the NOx catalyst 3 on the basis of the exhaust gas temperature detected by the temperature sensor 13. The temperature sensor 13 may be a sensor that detects the temperature of the NOx catalyst 3. The temperature of the NOx catalyst 3 can also be estimated on the basis of the operation state of the internal-combustion engine 1. Meanwhile, the addition valve 4, the throttle 7, and the frequency control device 33 are connected to the ECU 10 via electric wiring, and those devices are controlled by the ECU 10.

Figure 2:
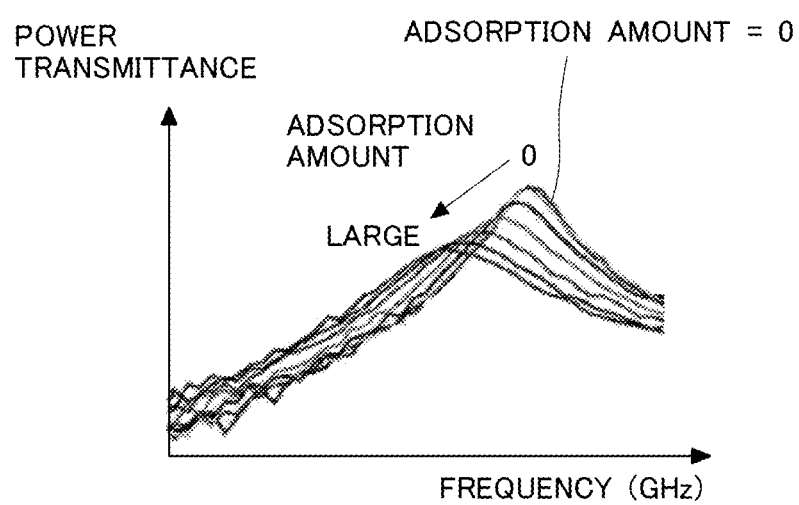
FIG. 2 is a diagram showing a relationship between the frequency of the microwave oscillated by an irradiation device and the power transmittance.

The ECU 10 performs the abnormality diagnosis of the NOx catalyst 3 on the basis of the resonance frequency when the irradiation device 30 irradiates the NOx catalyst 3 with the microwave, and the power transmittance at the resonance frequency. The power transmittance is a ratio of the reception power to the oscillation power when the microwave is generated between the first probe 31 and the second probe 32. FIG. 2 is a diagram illustrating a relationship between the frequency of the microwave at which the irradiation device 30 oscillates, and the power transmittance. The plurality of lines shown in FIG. 2 each indicate a case of which adsorption amount of the ammonia is different. The frequency at which the power transmittance becomes the highest in each line is the resonance frequency. FIG. 2 shows a case where only the ammonia is adsorbed on the NOx catalyst 3. The line denoted by "adsorption amount=0" indicates the relationship when the adsorption amount of the ammonia on the NOx catalyst 3 is 0, and the resonance frequency becomes the highest and the power transmittance becomes the highest when the adsorption amount is 0. As the adsorption amount of the ammonia increases, the resonance frequency decreases and the power transmittance decreases. The ammonia includes a permanent dipole, and the permanent dipole changes the orientation in accordance with the electric field. The permanent dipole of the ammonia adsorbed on the NOx catalyst 3 follows the change of the electric field of the microwave with a time lag, and hence the resonance frequency shifts to the side on which frequency is low due to the influence of the increase of the adsorption amount over the electromagnetic field. In addition, as the adsorption amount of the ammonia increases, the energy loss by the dielectric heating increases, and hence the power transmittance decreases. As described above, the resonance frequency and the power transmittance change in accordance with the amount of the ammonia adsorbed on the NOx catalyst 3.

Figure 3:
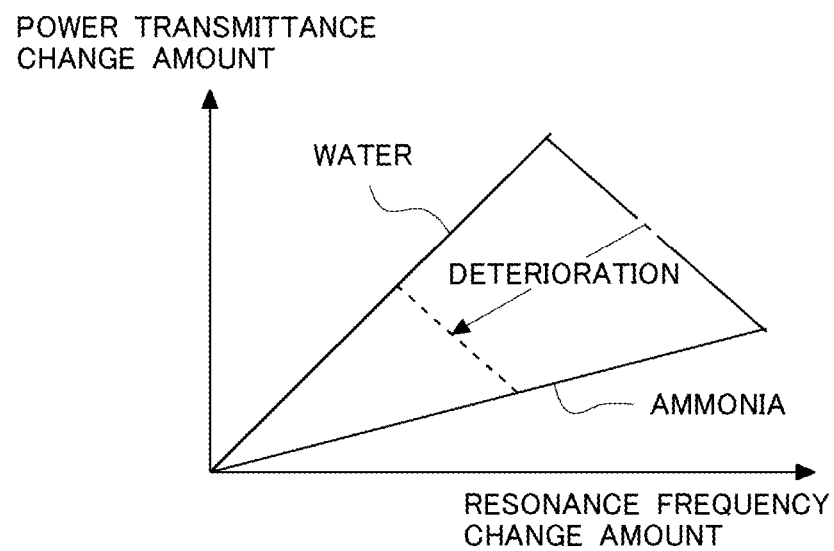
FIG. 3 is a diagram showing a relationship between the change amount of the resonance frequency and the change amount of the power transmittance for when water is adsorbed on all acid sites of the NOx catalyst, and for when ammonia is adsorbed on all of the acid sites of the NOx catalyst.

When the acid sites in the NOx catalyst 3 on which the ammonia is adsorbed decrease in number due to the deterioration of the NOx catalyst 3, the amount of ammonia that can adsorb on the NOx catalyst 3 decreases. This results in the decrease of the resonance frequency and the power transmittance. Therefore, it is conceivable to determine the deterioration of the NOx catalyst 3 on the basis of the resonance frequency and the power transmittance. However, when the temperature of the NOx catalyst 3 is low, the water generated when the fuel is burned may also adsorb on the acid sites. When a case where the water is adsorbed on the acid sites and a case where the ammonia is adsorbed on the acid sites are compared with each other, the cases have different influences on the resonance frequency and the power transmittance. Now, FIG. 3 is a diagram illustrating a relationship between the change amount of the resonance frequency and the change amount of the power transmittance for when the water is adsorbed on all of the acid sites of the NOx catalyst 3 and for when the ammonia is adsorbed on all of the acid sites of the NOx catalyst 3. The change amount of the resonance frequency on the horizontal axis is a value obtained by subtracting the resonance frequency when the ammonia or the water is adsorbed on all of the acid sites from the resonance frequency when the ammonia and the water are not adsorbed on the NOx catalyst 3. The change amount of the power transmittance on the vertical axis is a value obtained by subtracting the power transmittance when the ammonia or the water is adsorbed on all of the acid sites from the power transmittance when the ammonia and the water are not adsorbed on the NOx catalyst 3. In FIG. 3, the line denoted by "water" indicates a case where the water is adsorbed on all of the acid sites of the NOx catalyst 3, and the line denoted by "ammonia" indicates a case where the ammonia is adsorbed on all of the acid sites of the NOx catalyst 3.

With only the power transmittance after the ammonia or the water is adsorbed on the NOx catalyst 3, it cannot be known how much the absorption property of the microwave has changed due to the influence of the adsorption of the ammonia or the water. Therefore, in this embodiment, in order to detect the change in the absorption property of the microwave when the ammonia or the water is adsorbed on the NOx catalyst 3, the change amount of the power transmittance before and after the ammonia or the water is adsorbed on the NOx catalyst 3 is used. In addition, the resonance frequency may change in accordance with the individual difference of the NOx catalyst 3 and the like and the temperature of the NOx catalyst 3, and hence the change amount of the resonance frequency before and after the ammonia or the water is adsorbed on the NOx catalyst 3 is used in this embodiment in order to reduce those influences.

When the temperature of the NOx catalyst 3 is a temperature that enables the water to be adsorbed, the water is adsorbed on the acid sites on which the ammonia is not adsorbed. Therefore, the water or the ammonia is adsorbed on all of the acid sites after enough time has elapsed. The water absorbs more energy of the microwave than the ammonia, and hence has a large influence on the power transmittance. Meanwhile, the water has a smaller influence on the resonance frequency as compared to the ammonia. Therefore, as shown in FIG. 3, the ratio of the change amount of the power decrease rate to the change amount of the resonance frequency (that is, the inclination of the line in FIG. 3) is larger for the water than for the ammonia. The dotted line and the dot-and-dash line in FIG. 3 indicate the lines in which the change amount of the resonance frequency and the change amount of the power transmittance transition when the ratio between the adsorbed water and ammonia changes in the NOx catalyst 3 of which degree of deterioration is the same (that is, the number of the acid sites is the same). As described above, even when the degree of deterioration is the same, the relationship between the change amount of the resonance frequency and the change amount of the power transmittance changes in accordance with the ratio between the adsorbed water and ammonia. Even when the ratio between the water and the ammonia adsorbed on the NOx catalyst 3 is the same, the change amount of the resonance frequency and the change amount of the power transmittance decrease as the NOx catalyst 3 deteriorates as indicated by the arrow in FIG. 3.

Therefore, the ECU 10 compares the resonance frequency and the power transmittance between a state in which the ammonia and the water are not adsorbed on the NOx catalyst 3 and a state in which the ammonia or the water is adsorbed on all of the acid sites of the NOx catalyst 3, and diagnoses that the NOx catalyst 3 is abnormal when the change amount of the resonance frequency and the change amount of the power transmittance are in a predetermined range. The ECU 10 detects the resonance frequency and the power transmittance in the state in which the ammonia and the water are not adsorbed on the NOx catalyst 3 in advance, and then detects the resonance frequency and the power transmittance when the ammonia or the water is adsorbed on all of the acid sites state.

Figure 4:
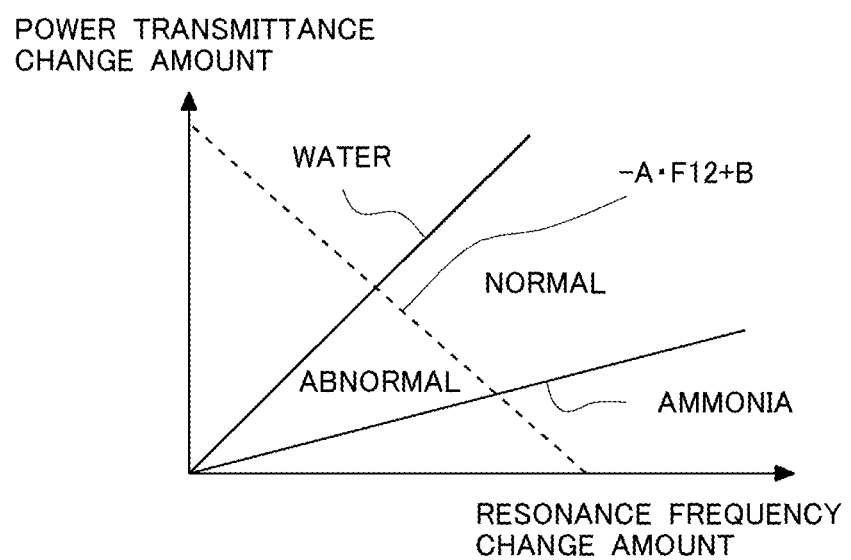
FIG. 4 is a diagram showing the ranges of the change amount of the resonance frequency and the change amount of the power transmittance for when the NOx catalyst is normal and for when the NOx catalyst is abnormal.

FIG. 4 is a diagram showing the ranges of the change amount of the resonance frequency and the change amount of the power transmittance for when the NOx catalyst 3 is normal and for when the NOx catalyst 3 is abnormal. A range below the line when the water is adsorbed on all of the acid sites (the line denoted by "water" in FIG. 4), above the line when the ammonia is adsorbed on all of the acid sites (the line denoted by "ammonia" in FIG. 4), and below the dotted line (the line denoted by $-A \cdot F21+B$) is the range in which the NOx catalyst 3 is diagnosed to be abnormal. A range below the line when the water is adsorbed on all of the acid sites (the line denoted by "water" in FIG. 4), above the line when the ammonia is adsorbed on all of the acid sites (the line denoted by "ammonia" in FIG. 4), and above the dotted line (the line denoted by $-A \cdot F21+B$) is the range in which the NOx catalyst 3 is diagnosed to be normal. The dotted line in FIG. 4 indicates a line along which transition occurs when the ratio between the ammonia and the water adsorbed on all of the acid sites changes when the NOx catalyst 3 is in a state of being on the borderline between normal and abnormal. The dotted line corresponds to a straight line passing through a point determined by the change amount of the resonance frequency and the change amount of the power transmittance when the water is adsorbed on all of the acid sites of the NOx catalyst 3 when the NOx catalyst 3 is in a state of being on the borderline between normal and abnormal, and a point determined by the change amount of the resonance frequency and the change amount of the power transmittance when the ammonia is adsorbed on all of the acid sites of the NOx catalyst 3 when the NOx catalyst 3 is in a state of being on the borderline between normal and abnormal. In FIG. 4, the change amount of the power transmittance and the change amount of the resonance frequency do not enter a range above the line denoted by "water" and below the line denoted by "ammonia".

The dotted line can be expressed by a linear function, that is, "$S21=-A \cdot F21+B$". The change amount of the power transmittance is represented by "$S21$". A coefficient "$A$" and an intercept "$B$" of the linear function are positive values that change in accordance with the temperature, and can be obtained in advance by an experiment, a simulation, or the like. A variable "F21" in the linear function represents the change amount of the resonance frequency. The ECU 10 detects the change amount of the resonance frequency and the change amount of the power transmittance, and diagnoses whether the NOx catalyst 3 is abnormal on the basis of the relationship illustrated in FIG. 4. That is, when the detected change amount of the power transmittance is smaller than the change amount of the power transmittance calculated from the relationship of "−A·F21+B", the NOx catalyst 3 is diagnosed to be abnormal. When the detected change amount of the power transmittance is equal to or more than the change amount of the power transmittance calculated from the relationship of "−A·F21+B", the NOx catalyst 3 is diagnosed to be normal. That is, the change amount of the power transmittance calculated from the relationship of "−A·F21+B" is an upper limit value of the change amount of the power transmittance at which the NOx catalyst 3 is diagnosed to be abnormal.

Figure 5:
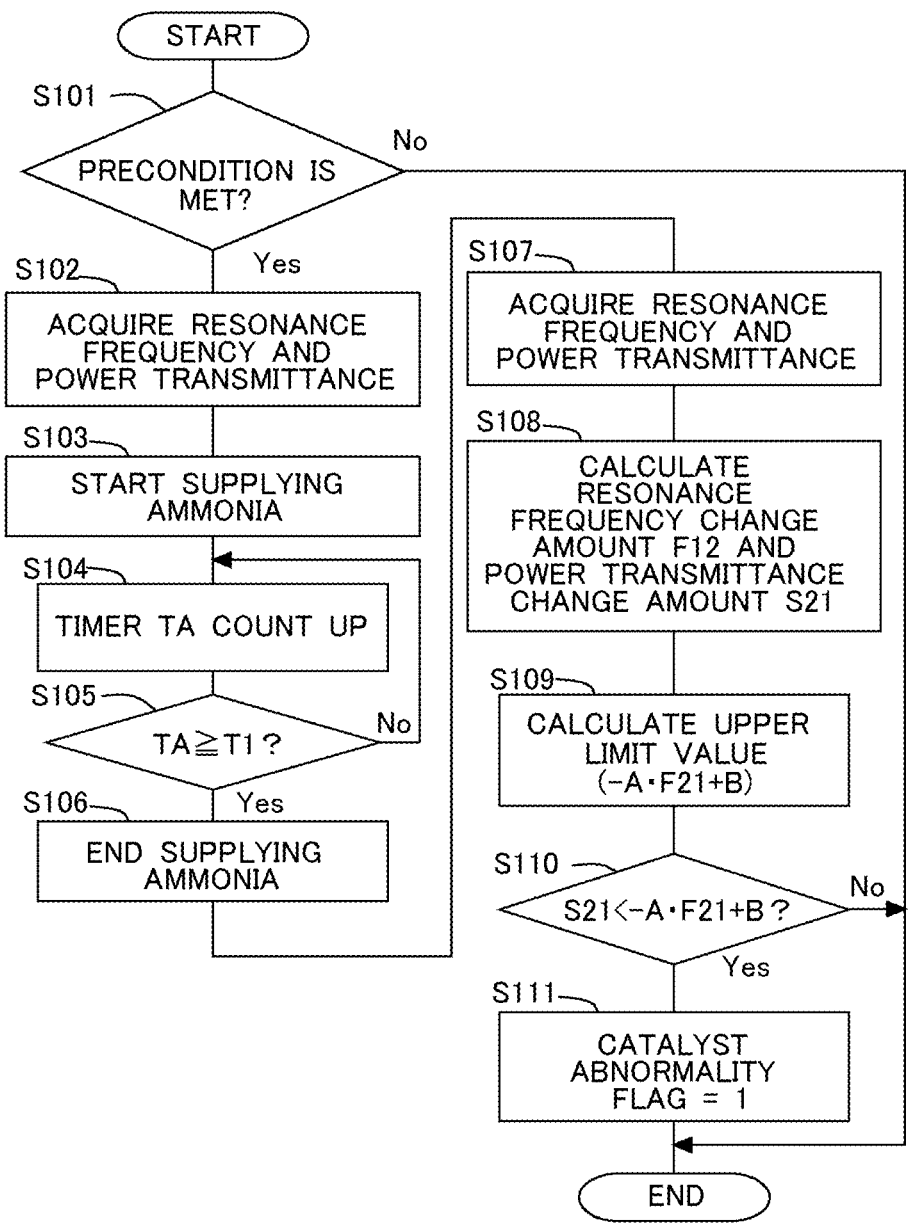
FIG. 5 is a flowchart illustrating the flow of abnormality diagnosis control according to Embodiment 1.

Next, the flow of abnormality diagnosis control according to this embodiment is described. FIG. 5 is a flowchart illustrating the flow of the abnormality diagnosis control according to this embodiment. The ECU 10 executes the abnormality diagnosis control at predetermined intervals by executing a program at predetermined intervals. The ECU 10 may check that there is no abnormality in devices other than the NOx catalyst 3 (for example, the addition valve 4) by a well-known technique before this flowchart is executed. In Step S101, the ECU 10 determines whether the preconditions for performing the abnormality diagnosis of the NOx catalyst 3 are met. In the abnormality diagnosis control according to this flowchart, the resonance frequency and the power transmittance in the state in which the ammonia and the water are not adsorbed on the NOx catalyst 3 are detected first, and hence one of the preconditions is that the ammonia and the water are not adsorbed on the NOx catalyst 3. In addition, when the temperature of the NOx catalyst 3 rises, the ammonia and the water easily desorb from the NOx catalyst 3, and hence it becomes difficult to adsorb the ammonia and the water on all of the acid sites. As a result, there is a fear that the accuracy of the abnormality diagnosis decreases. Therefore, one of the preconditions is that the temperature is equal to or lower than the temperature at which the required diagnosis accuracy can be ensured. The amount of the ammonia and the water adsorbed on the NOx catalyst 3 is related to the operation state of the internal-combustion engine 1 and the like, and hence can be estimated by the ECU 10 on the basis of the operation state of the internal-combustion engine 1 and the like. A well-known technique can be used in the estimation. When the adsorption amount of the ammonia and the water estimated as described above is 0, or when the adsorption amount of the ammonia and the water is more than 0 but is an adsorption amount that can ensure the required diagnosis accuracy, it is determined that one of the preconditions is met. When the temperature of the NOx catalyst 3 is detected by the temperature sensor 13 and the temperature of the NOx catalyst 3 is equal to or less than a temperature that can ensure the required diagnosis accuracy, it is determined that one of the preconditions is met. The operation state of the internal-combustion engine 1 in which the adsorption amount of the ammonia and the water and the temperature of the NOx catalyst 3 meet the preconditions may be obtained in advance by an experiment, a simulation, or the like, and it may be determined that all of the preconditions are met in the operation state. In Step S101, the processing proceeds to Step S102 when the determination is affirmative, and the abnormality diagnosis control is ended when the determination is negative.

In Step S102, the irradiation device 30 detects the resonance frequency and the power transmittance by irradiating the NOx catalyst 3 with the microwave, and the ECU 10 acquires the resonance frequency and the power transmittance. For the resonance frequency, there are cases where a plurality of frequencies are detected, and hence the frequency band to be detected may be specified. The power transmittance detected here is the power transmittance when the frequency of the microwave to be applied is a resonance frequency. The resonance frequency and the power transmittance are stored in the RAM of the ECU 10. The resonance frequency and the power transmittance when the ammonia and the water are not adsorbed on the NOx catalyst 3 at all can be obtained in advance for each temperature of the NOx catalyst 3 by an experiment, a simulation, or the like. In that case, the processing of Step S101 and Step S102 can be omitted. In Step S103, the ammonia starts to be supplied.

In Step S104, the ECU 10 causes a timer TA that counts the supply time of the ammonia to count up. The timer TA is reset to 0 when the flowchart starts or ends. In Step S105, the ECU 10 determines whether the timer TA is at a predetermined time T1 or more. The predetermined time T1 is set as a time necessary for supplying the amount of the ammonia sufficient for performing the abnormality diagnosis of the NOx catalyst 3 with a desired accuracy. In the abnormality diagnosis of the NOx catalyst 3, the resonance frequency and the power transmittance when the ammonia or the water is adsorbed on all of the acid sites of the NOx catalyst 3 need to be detected, and hence the ammonia is supplied until the state in which the ammonia or the water is adsorbed on all of the acid sites of the NOx catalyst 3 is obtained. Therefore, the predetermined time T1 is set so that the sufficient amount of the ammonia is supplied. The predetermined time T1 is set as a time for supplying an ammonia amount that can be adsorbed on all of the acid sites when it is supposed that the NOx catalyst 3 is abnormal, for example. When it is supposed that the NOx catalyst 3 is abnormal, the supply amount of the ammonia decreases as compared to when it is supposed that the NOx catalyst 3 is normal, and hence a case where the ammonia slips out from the NOx catalyst 3 can be suppressed. In addition, the water is adsorbed on the acid sites on which the ammonia is not adsorbed, and hence the ammonia or the water can be adsorbed on all of the acid sites. In this flowchart, the period in which the supply of the ammonia is to be ended is determined on the basis of the time by which the ammonia is supplied, but the period in which the supply of the ammonia is to be ended may be determined on the basis of the supply amount of the ammonia instead. The ammonia adsorption amount of the NOx catalyst 3 may be estimated, and the supply of the ammonia may be ended when the ammonia adsorption amount reaches an ammonia amount that can be adsorbed when it is supposed that the NOx catalyst 3 is abnormal. The ammonia adsorption amount can be estimated by a well-known technique. Even when the ammonia is not supplied to the NOx catalyst 3 at all, the ammonia does not necessarily need to be supplied at all depending on the temperature of the NOx catalyst 3 because the water may be adsorbed on all of the acid sites when the temperature of the NOx catalyst 3 is sufficiently low. In that case, the processing of Step S103 and the processing of Step S106 described below can be omitted. Then, the time until the water is adsorbed on all of the acid sites of the NOx catalyst 3 may be set as the predetermined time T1, and Step S105 may be executed. In addition, even when the ammonia of which amount is smaller than the amount by which the ammonia is adsorbed on all of the acid sites is supplied, the water is adsorbed on the remaining acid sites when the temperature of the NOx catalyst 3 is sufficiently low. Therefore, depending on the temperature of the NOx catalyst 3, the supply time of the ammonia may be shorter than the time for the ammonia to be adsorbed on all of the acid sites. The amount of the ammonia and the water that can be adsorbed on the NOx catalyst 3 decreases as the temperature of the NOx catalyst 3 rises, and hence the predetermined time T1 may be changed in accordance with the temperature of the NOx catalyst 3. The processing proceeds to Step S106 when the determination is affirmative in Step S105, and returns to Step S104 when the determination is negative. In Step S106, the ECU 10 ends the supply of the ammonia.

In Step S107, as in Step S102, the irradiation device 30 detects the resonance frequency and the power transmittance by irradiating the NOx catalyst 3 with the microwave, and the ECU 10 acquires the resonance frequency and the power transmittance. The resonance frequency and the power transmittance are stored in the RAM of the ECU 10. In Step S108, the ECU 10 calculates the change amount F21 of the resonance frequency by subtracting the resonance frequency acquired in Step S107 from the resonance frequency acquired in Step S102, and calculates the change amount S21 of the power transmittance by subtracting the power transmittance acquired in Step S107 from the power transmittance acquired in Step S102. When the change amount S21 of the power transmittance is a negative value, an absolute value is calculated. In Step S109, the ECU 10 calculates the upper limit value (−A·F21+B) of the change amount S21 of the power transmittance at which the NOx catalyst 3 can be said to be abnormal on the basis of the change amount F21 of the resonance frequency. The upper limit value corresponds to the dotted line in FIG. 4. Values "A" and "B" are values set in accordance with the temperature of the NOx catalyst 3, and are obtained in advance by an experiment, a simulation, or the like.

In Step S110, the ECU 10 determines whether the change amount S21 of the power transmittance is smaller than the upper limit value (−A·F21+B). When the determination is affirmative in Step S110, the processing proceeds to Step S111, and the ECU 10 sets a catalyst abnormality flag to 1. The catalyst abnormality flag is a flag that is set to 1 when there is an abnormality in the NOx catalyst 3, and set to 0 when the NOx catalyst 3 is normal. The initial value of the catalyst abnormality flag is 0. Meanwhile, when the determination is negative in Step S110, the ECU 10 ends the abnormality diagnosis control. The ECU 10 functions as a controller in the present disclosure by processing Step S110 and Step S111.

In this embodiment, the upper limit value of the change amount S21 of the power transmittance at which the NOx catalyst 3 can be said to be abnormal is calculated on the basis of the change amount F21 of the resonance frequency, but the upper limit value of the change amount F21 of the resonance frequency at which the NOx catalyst 3 can be said to be abnormal may be calculated on the basis of the change amount S21 of the power transmittance instead. Also in that case, the dotted line indicated in FIG. 4 corresponds to the upper limit value of the change amount F21 of the resonance frequency. In that case, the ECU 10 sets the catalyst abnormality flag to 1 when the change amount F21 of the resonance frequency is smaller than the upper limit value.

As described above, according to this embodiment, the abnormality diagnosis of the NOx catalyst 3 can be performed on the basis of the change amount of the resonance frequency and the change amount of the power transmittance detected when the NOx catalyst 3 is irradiated with the microwave. In addition, there is no need to supply the ammonia to the point where the ammonia flows out from the NOx catalyst 3, and hence the case where the ammonia flows out from the NOx catalyst 3 when the abnormality diagnosis is performed can be suppressed. As a result, the consumption amount of the ammonia can also be reduced.

Embodiment 2

Figure 6:
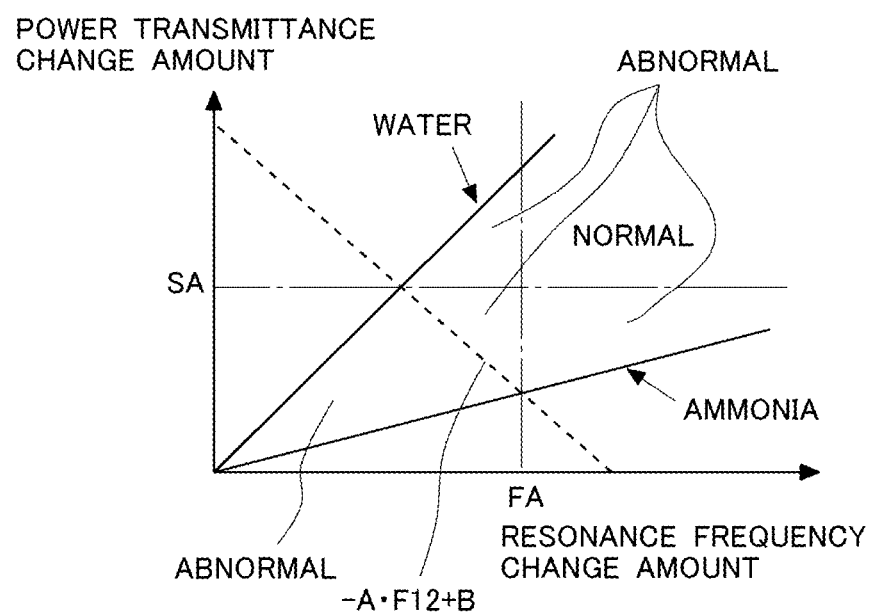
FIG. 6 is a diagram showing the ranges of the change amount of the resonance frequency and the change amount of the power transmittance for when the NOx catalyst is normal and for when the NOx catalyst is abnormal.

In Embodiment 2, a method of performing the abnormality diagnosis of the NOx catalyst 3 in an easier manner is described. Differences from Embodiment 1 are mainly described. FIG. 6 is a diagram showing the ranges of the change amount of the resonance frequency and the change amount of the power transmittance for when the NOx catalyst 3 is normal and for when the NOx catalyst 3 is abnormal. The lines denoted by "water", "ammonia", and "−A·F21+B" in FIG. 6 are the same as those in FIG. 4. In this embodiment, the NOx catalyst 3 is diagnosed to be abnormal when at least one of a case where the change amount of the resonance frequency is less than FA and a case where the change amount of the power transmittance is less than SA holds true. When the change amount of the resonance frequency is equal to or more than FA and the change amount of the power transmittance is equal to or more than SA, the NOx catalyst 3 is diagnosed to be normal.

In FIG. 6, FA is the change amount of the resonance frequency when the ammonia is adsorbed on all of the acid sites of the NOx catalyst 3 when it is supposed that the NOx catalyst 3 is in a state of being on the borderline between normal and abnormal. That is, FA is the change amount of the resonance frequency on an intersection point between the line denoted by "−A·F21+B" and the line denoted by "ammonia" in FIG. 6. In FIG. 6, SA is the change amount of the power transmittance when the water is adsorbed on all of the acid sites of the NOx catalyst 3 when it is supposed that the NOx catalyst 3 is in a state of being on the borderline between normal and abnormal. That is, SA is the change amount of the power transmittance on an intersection point between the line denoted by "−A·F21+B" and the line denoted by "water". Therefore, FA and SA are values that change in accordance with the temperature of the NOx catalyst 3, and are obtained in advance by an experiment, a simulation, or the like. The value FA is an upper limit value of the change amount of the resonance frequency at which the NOx catalyst 3 can be said to be abnormal, and the value SA is an upper limit value of the change amount of the power transmittance at which the NOx catalyst 3 can be said to be abnormal.

The value FA is the highest value out of the values that the change amount of the resonance frequency may be when the NOx catalyst 3 is in a state of being on the borderline between normal and abnormal. The value SA may be the highest value out of the values that the change amount of the power transmittance may be when the NOx catalyst 3 is in a state of being on the borderline between normal and abnormal. Therefore, it can be said that the NOx catalyst 3 is normal when the detected change amount of the resonance frequency is equal to or more than FA and the detected change amount of the power transmittance is equal to or more than SA. Meanwhile, there is a possibility that the NOx catalyst 3 is abnormal when the detected change amount of the resonance frequency is lower than FA or when the detected change amount of the power transmittance is lower than SA. In this embodiment, when there is a possibility that the NOx catalyst 3 is abnormal, it is always diagnosed that the NOx catalyst 3 is abnormal.

As can be understood by comparing FIG. 4 and FIG. 6 with each other, in the abnormality diagnosis of the NOx catalyst 3 in this embodiment, the range in which the NOx catalyst 3 is diagnosed to be abnormal is expanded. That is, even when the NOx catalyst 3 is actually normal, the NOx catalyst 3 may be diagnosed to be abnormal in this embodiment. In that case, the exchange of the NOx catalyst 3 is requested even when the purification of the NOx can be sufficiently performed in the NOx catalyst 3. However, in terms of the purification of the NOx, there is no problem because the exchange of the NOx catalyst 3 is requested before the abnormality actually occurs in the NOx catalyst 3.

As described above, the abnormality diagnosis of the NOx catalyst 3 can be performed by comparing the change amount of the resonance frequency and FA with each other, and comparing the change amount of the power transmittance and SA with each other. In that case, there is no need to calculate "−A·F21+B" as in Embodiment 1, and hence the abnormality diagnosis of the NOx catalyst 3 can be performed in an easier manner.

Figure 7:
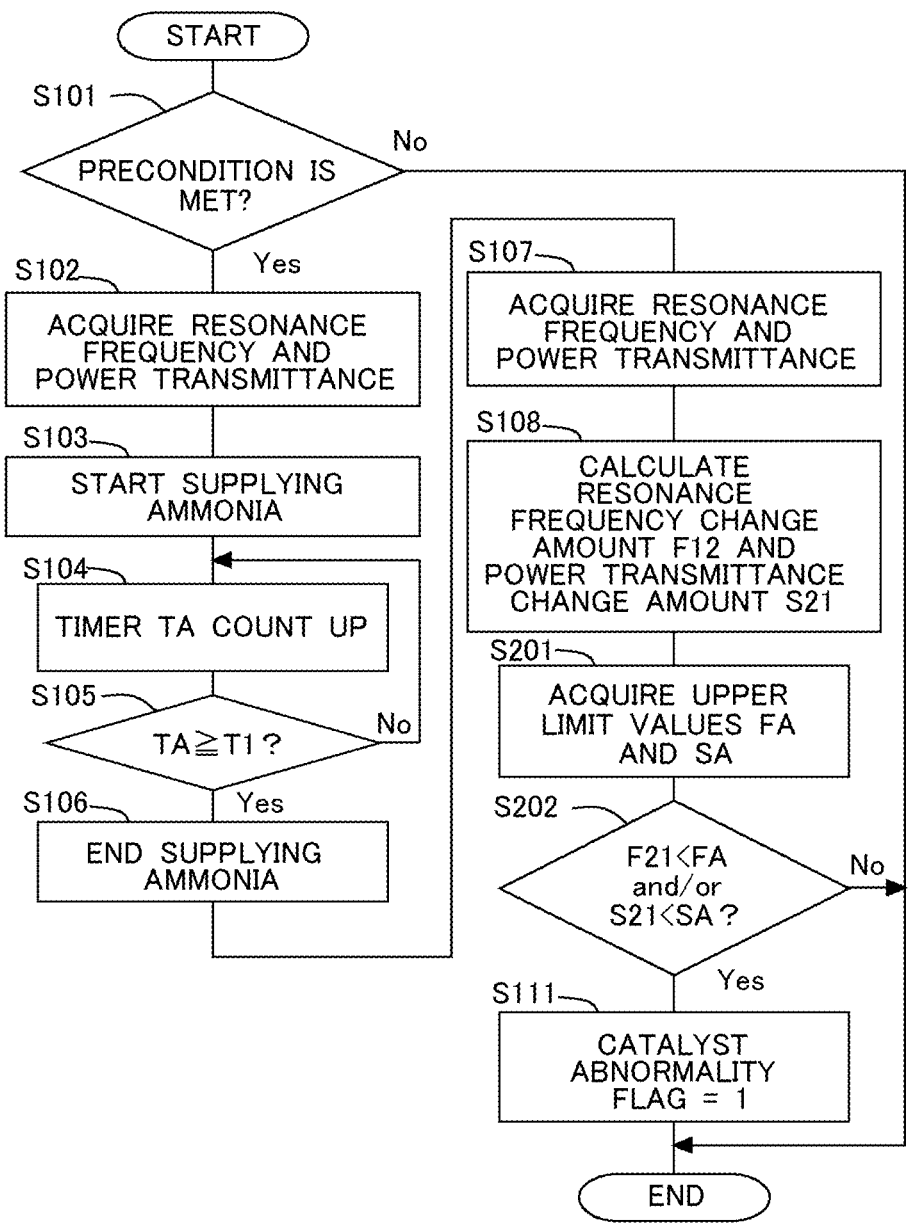
FIG. 7 is a flowchart illustrating the flow of abnormality diagnosis control according to Embodiment 2.

Next, the flow of abnormality diagnosis according to this embodiment is described. FIG. 7 is a flowchart illustrating the flow of the abnormality diagnosis control according to this embodiment. The ECU 10 executes the abnormality diagnosis control at predetermined intervals by executing a program at predetermined intervals. The ECU 10 may check that there is no abnormality in devices other than the NOx catalyst 3 (for example, the addition valve 4) by a well-known technique before this flowchart is executed. Steps in which the same processing as in the flowchart shown in FIG. 5 is executed are denoted by the same reference characters and description thereof is omitted.

In the flowchart illustrated in FIG. 7, the processing proceeds to Step S201 when the processing in Step S108 ends. In Step S201, the ECU 10 acquires the upper limit value FA of the change amount of the resonance frequency at which the NOx catalyst 3 can be said to be abnormal, and the upper limit value SA of the change amount of the power transmittance at which the NOx catalyst 3 can be said to be abnormal. The values FA and SA are stored in the RAM of the ECU 10 in association with the temperature of the NOx catalyst 3. In this embodiment, "A" and "B" in Embodiment 1 do not need to be stored. Then, in Step S202, the ECU 10 determines whether the change amount F21 of the resonance frequency is smaller than the upper limit value FA, and/or the change amount S21 of the power transmittance is smaller than the upper limit value SA. The processing proceeds to Step S111 when the determination is affirmative in Step S202, and ends the abnormality diagnosis control when the determination is negative. The ECU 10 functions as a controller in the present disclosure by processing Step S202 and Step S111.

As described above, according to this embodiment, the abnormality diagnosis of the NOx catalyst 3 can be performed in an easier manner on the basis of the change amount of the resonance frequency and the change amount of the power transmittance detected when the NOx catalyst 3 is irradiated with the microwave. In addition, there is no need to supply the ammonia to the point where the ammonia flows out from the NOx catalyst 3, and hence the case where the ammonia flows out from the NOx catalyst 3 when the abnormality diagnosis is performed can be suppressed.

Embodiment 3

Figure 8:
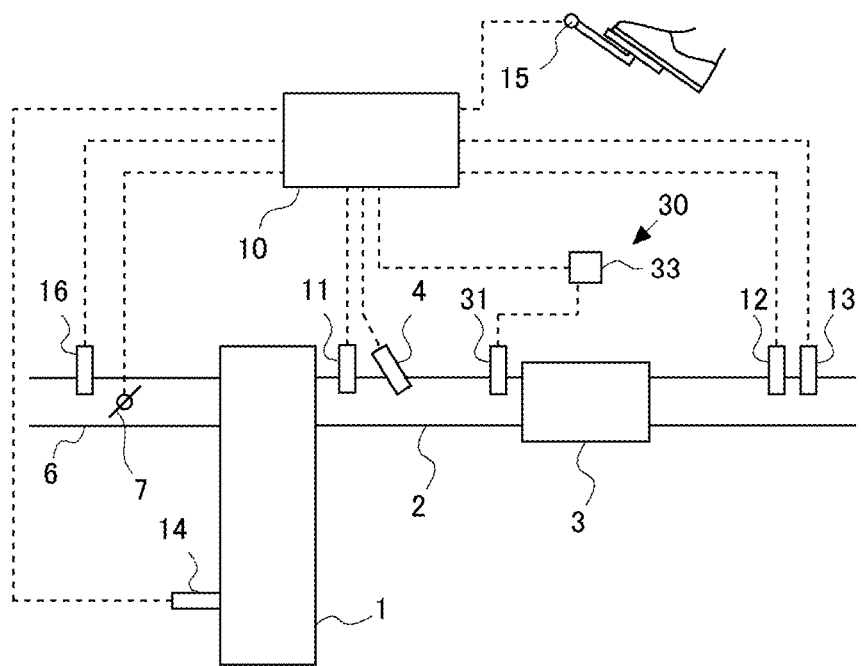
FIG. 8 is a view illustrating a schematic configuration of an internal-combustion engine, and an intake system and an exhaust system thereof according to Embodiment 3 and Embodiment 4.

FIG. 8 is a view illustrating a schematic configuration of the internal-combustion engine 1, and the intake system and the exhaust system thereof according to Embodiment 3. Differences from the abovementioned embodiments are mainly described. The irradiation device 30 that irradiates the NOx catalyst 3 with the microwave is provided in the exhaust passage 2. The irradiation device 30 includes the first probe 31 provided in the exhaust passage 2 upstream of the NOx catalyst 3, and the frequency control device 33. That is, this embodiment does not include the second probe 32. The first probe 31 irradiates the NOx catalyst 3 with the microwave, and the reflected microwave is received by the first probe 31. The frequency control device 33 can change the frequency of the microwave, and can acquire the resonance frequency and the power reflectance. The power reflectance is a ratio of the reception power to the oscillation power when the microwave is generated from the first probe 31. In this embodiment, the irradiation device 30 corresponds to the irradiation device in the present disclosure.

Figure 9:
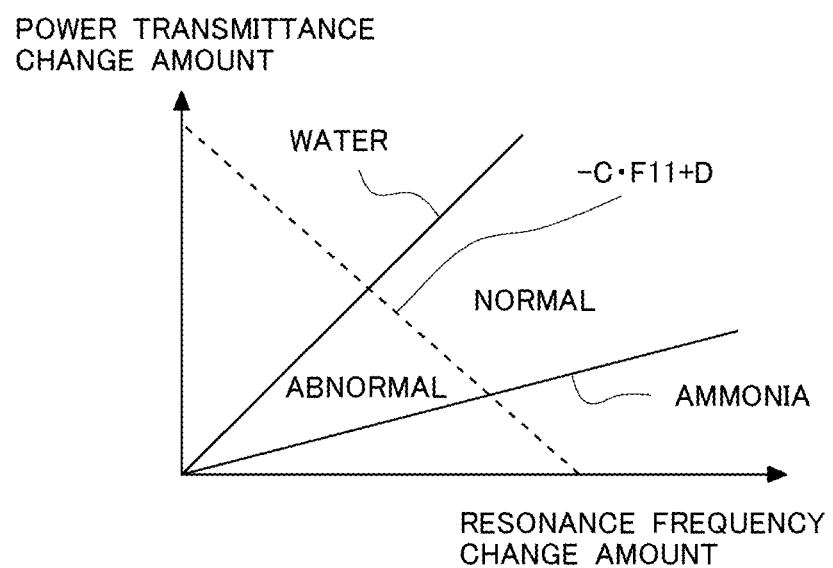
FIG. 9 is a diagram showing the ranges of the change amount of the resonance frequency and the change amount of the power reflectance for when the NOx catalyst is normal and for when the NOx catalyst is abnormal.

The power reflectance detected by the frequency control device 33 decreases as the adsorption amount of the ammonia increases as with the power transmittance described in the abovementioned embodiments. Therefore, the abnormality diagnosis of the NOx catalyst 3 can be performed with use of the power reflectance instead of the power transmittance in the abovementioned embodiments. FIG. 9 is a diagram showing the ranges of the change amount of the resonance frequency and the change amount of the power reflectance for when the NOx catalyst 3 is normal and for when the NOx catalyst 3 is abnormal. A range below the line when the water is adsorbed on all of the acid sites (the line denoted by "water" in FIG. 9), above the line when the ammonia is adsorbed on all of the acid sites (the line denoted by "ammonia" in FIG. 9), and below the dotted line (the line denoted by −C·F11+D) is the range in which the NOx catalyst 3 is diagnosed to be abnormal. A range below the line when the water is adsorbed on all of the acid sites (the line denoted by "water" in FIG. 9), above the line when the ammonia is adsorbed on all of the acid sites (the line denoted by "ammonia" in FIG. 9), and above the dotted line (the line denoted by −C·F11+D) is the range in which the NOx catalyst 3 is diagnosed to be normal. The dotted line in FIG. 9 indicates a line along which transition occurs when the ratio between the ammonia and the water adsorbed on all of the acid sites changes when the NOx catalyst 3 is in a state of being on the borderline between normal and abnormal. The dotted line corresponds to a straight line passing through a point determined by the change amount of the resonance frequency and the change amount of the power reflectance when the water is adsorbed on all of the acid sites of the NOx catalyst 3 when the NOx catalyst 3 is in a state of being on the borderline between normal and abnormal and a point determined by the change amount of the resonance frequency and the change amount of the power reflectance when the ammonia is adsorbed on all of the acid sites of the NOx catalyst 3 when the NOx catalyst 3 is in a state of being on the borderline between normal and abnormal. In FIG. 9, the change amount of the power reflectance and the change amount of the resonance frequency do not enter a range above the line denoted by "water" and below the line denoted by "ammonia".

The dotted line can be expressed by a linear function, that is, "S11=−C·F11+D". The change amount of the power reflectance is represented by "S11". A coefficient "C" and an intercept "D" of the linear function are positive values that change in accordance with the temperature, and can be obtained in advance by an experiment, a simulation, or the like. A variable "F11" in the linear function indicates the change amount of the resonance frequency. The ECU 10 detects the change amount of the resonance frequency and the change amount of the power reflectance, and diagnoses whether the NOx catalyst 3 is abnormal on the basis of the relationship shown in FIG. 9. That is, when the detected change amount of the power reflectance is smaller than the change amount of the power reflectance calculated from the relationship of "−C·F11+D", the NOx catalyst 3 is diagnosed to be abnormal. When the detected change amount of the power reflectance is equal to or more than the change amount of the power reflectance calculated from the relationship of "−C·F11+D", the NOx catalyst 3 is diagnosed to be normal. That is, the change amount of the power reflectance calculated from the relationship of "−A·F21+B" is an upper limit value of the change amount of the power reflectance at which the NOx catalyst 3 is diagnosed to be abnormal.

Figure 10:
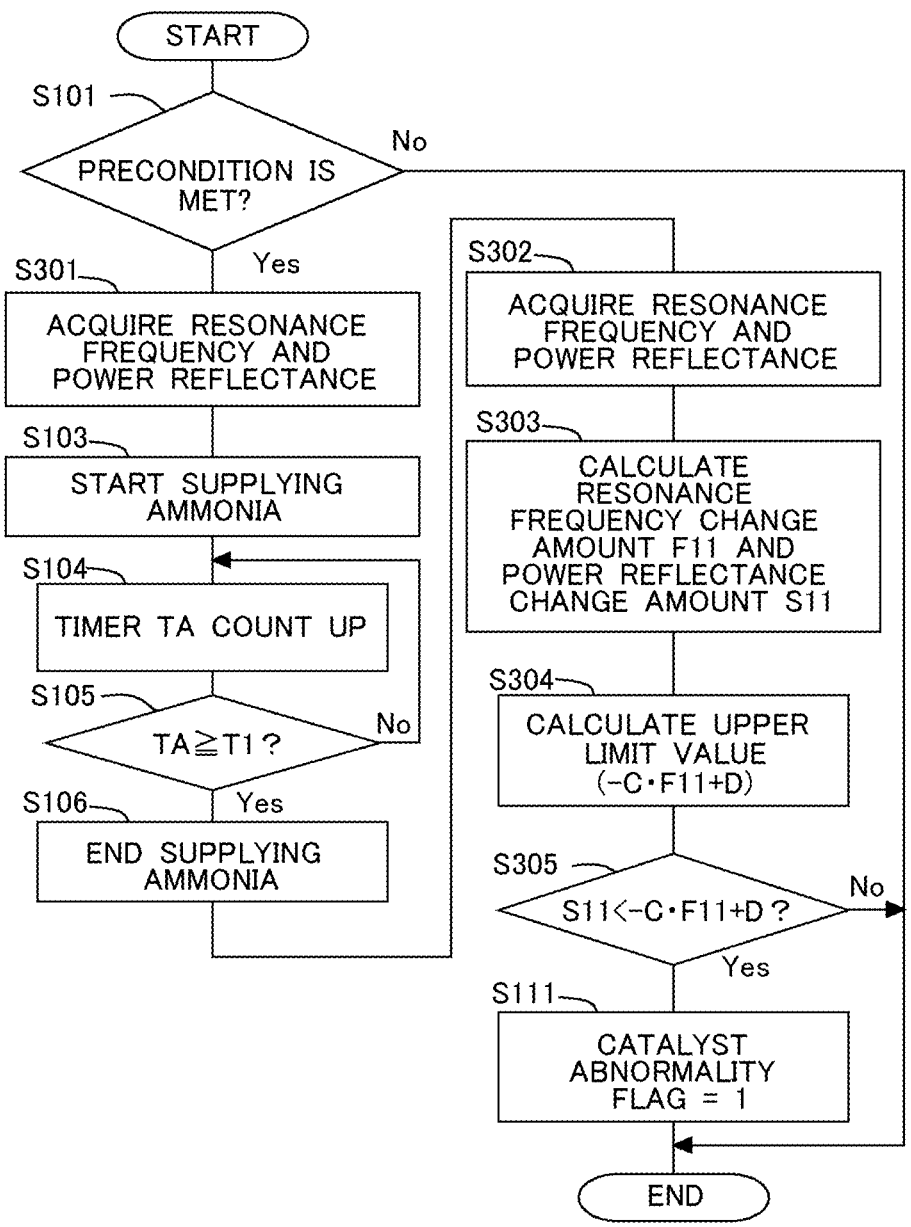
FIG. 10 is a flowchart illustrating the flow of abnormality diagnosis control according to Embodiment 3.

Next, the flow of abnormality diagnosis control according to this embodiment is described. FIG. 10 is a flowchart illustrating the flow of the abnormality diagnosis control according to this embodiment. The ECU 10 executes the abnormality diagnosis control at predetermined intervals by executing a program at predetermined intervals. The ECU 10 may check that there is no abnormality in devices other than the NOx catalyst 3 (for example, the addition valve 4) by a well-known technique before this flowchart is executed. Steps in which the same processing as in the flowchart illustrated in FIG. 5 is executed are denoted by the same reference characters and description thereof is omitted.

In the flowchart illustrated in FIG. 10, the processing proceeds to Step S301 when the determination is affirmative in Step S101. In Step S301, the irradiation device 30 detects the resonance frequency and the power reflectance by irradiating the NOx catalyst 3 with the microwave, and the ECU 10 acquires the resonance frequency and the power reflectance. For the resonance frequency, there are cases where a plurality of frequencies are detected, and hence the frequency band to be detected may be specified. The power reflectance detected here is the power reflectance when the frequency of the microwave to be applied is a resonance frequency. The resonance frequency and the power reflectance are stored in the RAM of the ECU 10.

In the flowchart illustrated in FIG. 10, the processing proceeds to Step S302 when the processing in Step S106 ends. In Step S302, as in Step S301, the irradiation device 30 detects the resonance frequency and the power reflectance by irradiating the NOx catalyst 3 with the microwave, and the ECU 10 acquires the resonance frequency and the power reflectance. The resonance frequency and the power reflectance are stored in the RAM of the ECU 10. In Step S303, the ECU 10 calculates the change amount F11 of the resonance frequency by subtracting the resonance frequency acquired in Step S302 from the resonance frequency acquired in Step S301, and calculates the change amount S11 of the power reflectance by subtracting the power reflectance acquired in Step S302 from the power reflectance acquired in Step S301. When the change amount S11 of the power reflectance is a negative value, an absolute value is calculated. In Step S304, the ECU 10 calculates the upper limit value (−C·F11+D) of the change amount S11 of the power reflectance at which the NOx catalyst 3 can be said to be abnormal on the basis of the change amount F11 of the resonance frequency. The upper limit value corresponds to the dotted line in FIG. 9. The values "C" and "D" are values set in accordance with the temperature of the NOx catalyst 3, and are obtained in advance by an experiment, a simulation, or the like.

In Step S305, the ECU 10 determines whether the change amount S11 of the power reflectance is smaller than the abovementioned upper limit value (−C·F11+D). When the determination is affirmative in Step S305, the processing proceeds to Step S111, and the ECU 10 sets the catalyst abnormality flag to 1. Meanwhile, when the determination is negative in Step S305, the ECU 10 ends the abnormality diagnosis control. The ECU 10 functions as a controller in the present disclosure by processing Step S305 and Step S111.

In this embodiment, the upper limit value of the change amount S11 of the power reflectance at which the NOx catalyst 3 can be said to be abnormal is calculated on the basis of the change amount F11 of the resonance frequency, but the upper limit value of the change amount F11 of the resonance frequency at which the NOx catalyst 3 can be said to be abnormal may be calculated on the basis of the change amount S11 of the power reflectance instead. Also in that case, the dotted line indicated in FIG. 9 corresponds to the upper limit value of the change amount F11 of the resonance frequency. In that case, the ECU 10 sets the catalyst abnormality flag to 1 when the change amount F11 of the resonance frequency is smaller than the upper limit value.

As described above, according to this embodiment, the abnormality diagnosis of the NOx catalyst 3 can be performed on the basis of the change amount of the resonance frequency and the change amount of the power reflectance detected when the NOx catalyst 3 is irradiated with the microwave. In addition, there is no need to supply the ammonia to the point where the ammonia flows out from the NOx catalyst 3, and hence the case where the ammonia flows out from the NOx catalyst 3 when the abnormality diagnosis is performed can be suppressed. As a result, the consumption amount of the ammonia can also be reduced. In addition, in the irradiation device 30 according to Embodiment 3, the detection accuracy of the resonance frequency decreases because the irradiation device 30 does not include the second probe 32, but the installation of the irradiation device 30 becomes easy because a space for installing the second probe 32 is unnecessary.

Embodiment 4

Figure 11:
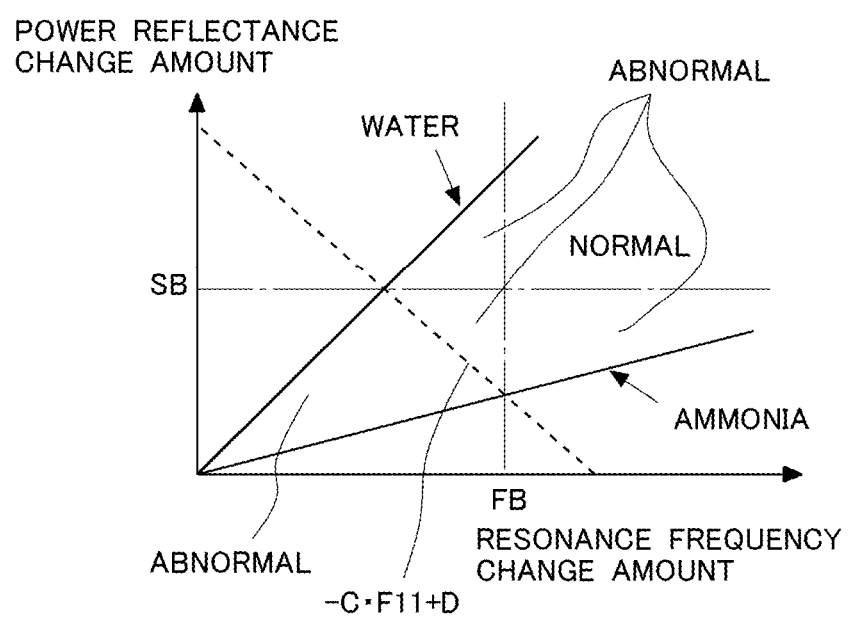
FIG. 11 is a diagram showing the ranges of the change amount of the resonance frequency and the change amount of the power reflectance for when the NOx catalyst is normal and for when the NOx catalyst is abnormal.

In Embodiment 4, a method of performing the abnormality diagnosis of the NOx catalyst 3 in an easier manner in the system illustrated in FIG. 8 is described. Differences from Embodiment 3 are mainly described. FIG. 11 is a diagram showing the ranges of the change amount of the resonance frequency and the change amount of the power reflectance for when the NOx catalyst 3 is normal and for when the NOx catalyst 3 is abnormal. The lines denoted by "water", "ammonia", and "−C·F11+D" in FIG. 11 are the same as those in FIG. 9. In this embodiment, the NOx catalyst 3 is diagnosed to be abnormal when at least one of a case where the change amount of the resonance frequency is lower than FB and a case where the change amount of the power reflectance lower than SB holds true. The NOx catalyst 3 is diagnosed to be normal when the change amount of the resonance frequency is equal to or more than FB and the change amount of the power reflectance is equal to or more than SB.

In FIG. 11, FB is the change amount of the resonance frequency when the ammonia is adsorbed on all of the acid sites of the NOx catalyst 3 when the NOx catalyst 3 is in a state of being on the borderline between normal and abnormal. That is, FB is the change amount of the resonance frequency on an intersection point between the line denoted by "−C·F11+D" and the line denoted by "ammonia" in FIG. 11. In FIG. 11, SB is the change amount of the power reflectance when the water is adsorbed on all of the acid sites of the NOx catalyst 3 when the NOx catalyst 3 is in a state of being on the borderline between normal and abnormal. That is, SB is the change amount of the power reflectance on an intersection point between the line denoted by "−C·F11+D" and the line denoted by "water". Therefore, FB and SB are values that change in accordance with the temperature of the NOx catalyst 3, and are obtained in advance by an experiment, a simulation, or the like. The value FB is an upper limit value of the change amount of the resonance frequency at which the NOx catalyst 3 can be said to be abnormal and the value SB is an upper limit value of the change amount of the power reflectance at which the NOx catalyst 3 can be said to be abnormal.

The value FB is the highest value out of the values that the change amount of the resonance frequency may be when the NOx catalyst 3 is in a state of being on the borderline between normal and abnormal. The value SB is the highest value out of the values that the change amount of the power reflectance may be when the NOx catalyst 3 is in a state of being on the borderline between normal and abnormal. Therefore, it can be said that the NOx catalyst 3 is normal when the detected change amount of the resonance frequency is equal to or more than FB and the detected change amount of the power reflectance is equal to or more than SB. Meanwhile, there is a possibility that the NOx catalyst 3 is abnormal when the detected change amount of the resonance frequency is lower than FB or when the detected change amount of the power reflectance is lower than SB. In this embodiment, when there is a possibility that the NOx catalyst 3 is abnormal, it is always diagnosed that the NOx catalyst 3 is abnormal.

As can be understood by comparing FIG. 9 and FIG. 11 with each other, in the abnormality diagnosis of the NOx catalyst 3 in this embodiment, the range in which the NOx catalyst 3 is diagnosed to be abnormal is expanded. That is, even when the NOx catalyst 3 is actually normal, the NOx catalyst 3 may be diagnosed to be abnormal in this embodiment. In that case, the exchange of the NOx catalyst 3 is requested even when the purification of the NOx can be sufficiently performed in the NOx catalyst 3. However, in terms of the purification of the NOx, there is no problem because the NOx catalyst 3 is exchanged before the abnormality actually occurs in the NOx catalyst 3.

As described above, the abnormality diagnosis of the NOx catalyst 3 can be performed by comparing the change amount of the resonance frequency with FB and comparing the change amount of the power reflectance with SB. In that case, there is no need to calculate "−C·F11+D" as in Embodiment 3, and hence the abnormality diagnosis of the NOx catalyst 3 can be performed in an easier manner.

Figure 12:
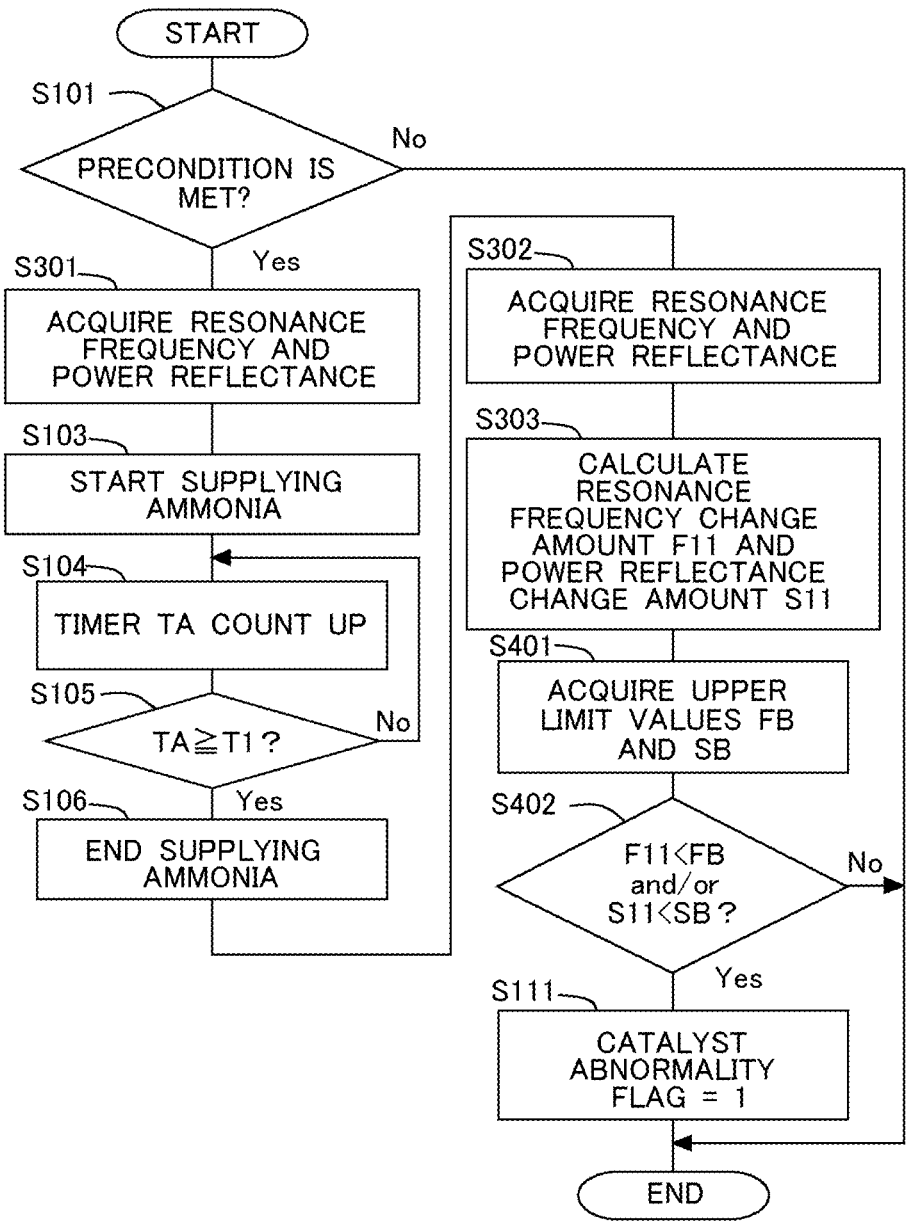
FIG. 12 is a flowchart illustrating the flow of abnormality diagnosis control according to Embodiment 4.

Next, the flow of abnormality diagnosis according to this embodiment is described. FIG. 12 is the flow of a flowchart illustrating the abnormality diagnosis control according to this embodiment. The ECU 10 executes the abnormality diagnosis control at predetermined intervals by executing a program at predetermined intervals. The ECU 10 may check that there is no abnormality in devices other than the NOx catalyst 3 (for example, the addition valve 4) by a well-known technique before this flowchart is executed. Steps in which the same processing as in the flowchart in FIG. 10 is executed are denoted by the same reference characters and description thereof is omitted.

In the flowchart illustrated in FIG. 12, the processing proceeds to Step S401 when the processing in Step S303 ends. In Step S401, the ECU 10 acquires the upper limit value FB of the change amount of the resonance frequency at which the NOx catalyst 3 can be said to be abnormal and the upper limit value SB of the change amount of the power reflectance at which the NOx catalyst 3 can be said to be abnormal. The values FB and SB are stored in the RAM of the ECU 10 in association with the temperature of the NOx catalyst 3. In this embodiment, "C" and "D" in Embodiment 3 do not need to be stored. In Step S402, the ECU 10 determines whether the change amount F11 of the resonance frequency is smaller than the upper limit value FB and/or the change amount S11 of the power reflectance is smaller than the upper limit value SB. The processing proceeds to Step S111 when the determination is affirmative in Step S402, and ends the abnormality diagnosis control when the determination is negative. The ECU 10 functions as a controller in the present disclosure by processing Step S402 and Step S111.

As described above, according to this embodiment, the abnormality diagnosis of the NOx catalyst 3 can be performed in an easier manner on the basis of the change amount of the resonance frequency and the change amount of the power reflectance detected when the NOx catalyst 3 is irradiated with the microwave. In addition, there is no need to supply the ammonia to the point where the ammonia flows out from the NOx catalyst 3, and hence the case where the ammonia flows out from the NOx catalyst 3 when the abnormality diagnosis is performed can be suppressed.

What is claimed is:

1. An abnormality diagnosis apparatus for diagnosing an abnormality in an exhaust gas purification device of an internal-combustion engine,
    the exhaust gas purification device comprising:
        a selective reduction NOx catalyst provided in an exhaust passage of the internal-combustion engine, and configured to selectively reduce NOx by ammonia; and
        an addition valve configured to supply ammonia to the selective reduction NOx catalyst,
    the abnormality diagnosis apparatus comprising:
        an irradiation device configured to
            irradiate the selective reduction NOx catalyst with an electromagnetic wave, and
            detect a resonance frequency and a power ratio of a reception power to an oscillation power at the time of the irradiation; and
        a controller configured to
            obtain a linear function expressing a relationship between a resonance frequency change amount of the resonance frequency and a power ratio change amount of the power ratio, the linear function indicating a straight line passing through
                a first point corresponding to the resonance frequency change amount and the power ratio change amount when water is adsorbed on all of acid sites included in the selective reduction NOx catalyst when it is supposed that the selective reduction NOx catalyst is in a state of being on a borderline of abnormality, and a second point corresponding to the resonance frequency change amount and the power ratio change amount when ammonia is adsorbed on all of the acid sites included in the selective reduction NOx catalyst when it is supposed that the selective reduction NOx catalyst is in a state of being on a borderline of abnormality, determine current values of the resonance frequency change amount and the power ratio change amount, determine either an upper limit value of the power ratio change amount, by substituting the current value of the resonance frequency change amount into the linear function, or an upper limit value of the resonance frequency change amount, by substituting the current value of the power ratio change amount into the linear function, and diagnose that the selective reduction NOx catalyst is abnormal when the current value of the resonance frequency change amount is equal to or lower than the upper limit value of the resonance frequency change amount, or when the current value of the power ratio change amount is equal to or lower than the upper limit value of the power ratio change amount.

2. The abnormality diagnosis apparatus according to claim 1, wherein the controller is further configured to change the upper limit value of the resonance frequency change amount and the upper limit value of the power ratio change amount, in accordance with a temperature of the selective reduction NOx catalyst.

3. An abnormality diagnosis apparatus for diagnosing an abnormality in an exhaust gas purification device of an internal-combustion engine, the exhaust gas purification device comprising:

a selective reduction NOx catalyst provided in an exhaust passage of the internal-combustion engine, and configured to selectively reduce NOx by ammonia; and an addition valve configured to supply ammonia to the selective reduction NOx catalyst, the abnormality diagnosis apparatus comprising:

an irradiation device configured to irradiate the selective reduction NOx catalyst with an electromagnetic wave, and detect a resonance frequency and a power ratio of a reception power to an oscillation power at the time of the irradiation; and a controller configured to determine current values of a resonance frequency change amount of the resonance frequency, and a power ratio change amount of the power ratio, acquire an upper limit value of the resonance frequency change amount at which ammonia is adsorbed on all of acid sites included in the selective reduction NOx catalyst when it is supposed that the selective reduction NOx catalyst is in a state of being on a borderline of abnormality, acquire an upper limit value of the power ratio change amount at which water is adsorbed on all of the acid sites included in the selective reduction NOx catalyst when it is supposed that the selective reduction NOx catalyst is in a state of being on a borderline of abnormality, and diagnose that the selective reduction NOx catalyst is abnormal when at least one of (i) a first case where the current value of the resonance frequency change amount is equal to or lower than the upper limit value of the resonance frequency change amount and (ii) a second case where the current value of the power ratio change amount is equal to or lower than the upper limit value of the power ratio change amount, holds true.

4. The abnormality diagnosis apparatus according to claim 3, wherein the controller is further configured to change the upper limit value of the resonance frequency change amount and the upper limit value of the power ratio change amount, in accordance with a temperature of the selective reduction NOx catalyst.

* * * * *